United States Patent

Westphal

[15] 3,703,837

[45] Nov. 28, 1972

[54] ARTICLE FOR USE IN SOUND RECORDING AND REPRODUCING INSTRUMENTS

[72] Inventor: Klaus Westphal, Berlin, Germany

[73] Assignee: Telefunken Patentyerwertungsgesellschaft m. b. H., Ulm/Donau, Germany

[22] Filed: Dec. 15, 1970

[21] Appl. No.: 98,435

Related U.S. Application Data

[63] Continuation of Ser. No. 701,948, Jan. 31, 1968, abandoned.

[30] Foreign Application Priority Data

May 10, 1967 Germany....................T 33829

[52] U.S. Cl.......................................................74/519

[51] Int. Cl................................................G05g 1/04

[58] Field of Search..................74/519, 470; 220/315

[56] References Cited

UNITED STATES PATENTS

| | | | |
|---|---|---|---|
| 3,388,611 | 6/1968 | Clary et al. | 74/513 |
| 3,373,892 | 3/1968 | Landen | 220/31 |

FOREIGN PATENTS OR APPLICATIONS

| | | | |
|---|---|---|---|
| 624,331 | 6/1949 | Great Britain | 74/519 |

*Primary Examiner*—Milton Kaufman
*Attorney*—Spencer and Kaye

[57] ABSTRACT

An article of manufacture for use in sound recording and/or reproducing apparatus which is formed, by injection-molding, from a thermoplastic synthetic material. The article is formed into chassis and lever portions; the lever portions being pivotable with respect to the chassis portion about a pivot axis provided in a means connecting the lever portions to the chassis.

4 Claims, 6 Drawing Figures

INVENTOR
Klaus Westphal

BY Spencer & Kaye
ATTORNEYS

INVENTOR
Klaus Westphal

BY Spencer & Kaye
ATTORNEYS

INVENTOR
Klaus Westphal

BY Spencer & Kaye
ATTORNEYS

ARTICLE FOR USE IN SOUND RECORDING AND REPRODUCING INSTRUMENTS

CROSS REFERENCE TO A RELATED APPLICATION

This application is a continuation of copending application, Ser. No. 701,948, filed Jan. 31st, 1968, now abandoned.

BACKGROUND OF THE INVENTION

The present invention relates to an article of manufacture for use in sound-recording and/or reproducing instruments formed of a thermoplastic synthetic material in a single piece by injection-molding and, more particularly, to a base plate having a chassis and lever portions; each lever portion being connected to the chassis portion by means around which the lever portion may be pivoted with respect to the chassis portion.

In magnetic sound instruments for the home, a substantial part of the manufacturing cost stems from the mechanical assembly of the instrument. Even with instruments in the less expensive price ranges, there are limits to how far costs can be reduced, since certain minimal requirements or standards must be met to assure quality in reproduction. These standards, in order to be maintained, require precise workmanship in assembling the operating components of the instrument.

In keeping with the standards required, one approach known to the industry for reducing the cost of installation and, therefore, the price at which the instrument is sold has been to produce a base plate for supporting the various operating components of the instrument, by a die-casting or injection-molding process. The various mountings and bearing points for the operating instrument components are produced in such a process as part of the unitary whole comprising the base plate. Even though a base plate produced in such a manner eliminates many of the time-consuming and, therefore, costly steps required in the installation process including simplifying or eliminating the separate step of preparing bearing surfaces, it still continues to be necessary to separately install a multitude of separately manufactured components, as for example, brakes, forward and reverse levers, angular guide members, voltage selector plates, soldering ledges etc.

SUMMARY OF THE INVENTION

It is therefore an object of the present invention to overcome the above-discussed drawbacks.

The present invention has as a further object to substantially reduce the manufacturing costs of sound-recording and/or playback instruments.

Yet another object of this invention is to provide a relatively simple one-piece injection-molded article of manufacture for sound-recording and/or playback instruments.

In brief, the present invention deals with the problems discussed above by providing a one-piece injection-molded base plate having joined to it both chassis and lever portions, by means of connecting portions, to form an integral whole. The article, according to the invention, further provides that the lever portions will be movable with respect to the chassis portion by severing, or eliminating in the case of each lever portion so provided, all of the connecting portions except one; said one remaining connecting portion providing for each lever portion a fulcrum around which each lever can be moved.

In yet another form of the invention all of the connecting portions joining each lever portion provided to the chassis portion are severed and a separate connecting member is provided to join each lever portion to the chassis portion. The separate connecting member, is adapted to serve as a fulcrum about which the lever portion can be moved with respect to the chassis portion of the base plate.

A base plate, thus formed, will result in relatively low manufacturing costs, in-as-much as, all of the components which have no direct bearing on the quality of recording and reproduction of the instrument, (e.g. levers, bearings and pivotal means) which previously had to be separately manufactured and installed, can now be injection-molded in one operating step. Thus additional expenditures for separately producing these components and for separately installing them in the instrument, which step required both mounting and fastening, are eliminated and, as a consequence, the overall manufacturing cost of the instrument is reduced.

In order to guarantee good molding of the lever portions during the injection-molding process, a number of contact points or connecting portions are provided between the lever and chassis portions of the article. Preferably, for each lever portion provided, one of these connecting portions is so disposed and is molded in such a configuration that it will serve as a fulcrum for the lever after all the other connecting portions have been separated. This reduced cross section connecting portion will include a pivot axis about which the lever can be pivotally moved with respect to the chassis portion.

In another form of the invention, a separate connecting member made from thermoplastic synthetic material and having a reduced cross section in the region of its center is used. In this embodiment of the invention the chassis and each lever portion are provided with attaching means whereby the separate connecting member can be attached to each portion, respectively, hence, connecting one to the other. The preferred form of the attaching means in each portion, respectively, is as a recess. The separate connecting member is suitably configured to complement these recesses so that it can be attached or inserted into them with ease. After inserting the separate connecting member into the provided recesses all other connecting portions are severed, and the separate connecting member will serve as a fulcrum about which the lever portion can pivotally be moved with respect to the chassis portions. One advantage of this form of the invention is that all but the separate connecting member may be manufactured from a less expensive material. This, of course, would not be possible in the previously discussed form of the invention.

By a further aspect of the invention means is provided whereby the fulcrum or connecting means is reinforced by relieving some of the stresses encountered under heavy conditions. Such a means includes two holes that extend through the connecting means, whether it be the unsevered connecting portion or the separate connecting member. These holes extend in parallel relationship both to each other and to the pivot axis in the connecting means. One hole is positioned in the connecting means on the lever side of the pivot axis; the other is positioned in the connecting means on the chassis side. A U-shaped member, each leg of which is insertable through the holes thus defined in the connecting means is also provided, such that, when the U-shaped member is so inserted into the holes the connecting means will be reinforced.

BRIEF DESCRIPTION OF THE DRAWINGS

The invention both as to structure and further objects and advantages thereof may best be understood by reference to the following description taken in conjunction with the accompanying drawings in which.

DESCRIPTION OF THE PREFERRED EMBODIMENTS

Figure 2:
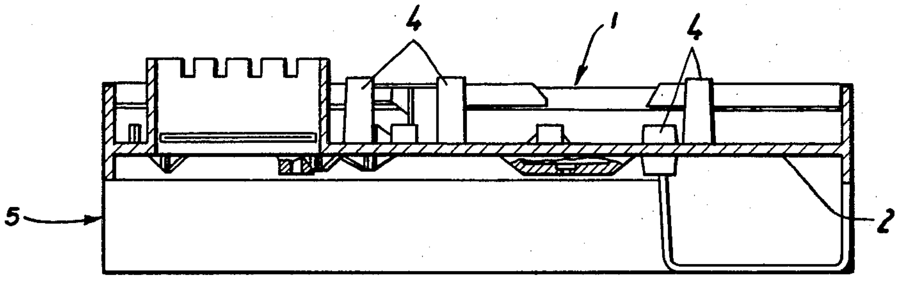
FIG. 2 is a section of FIG. 1 viewed along line 2—2.
Figure 1:
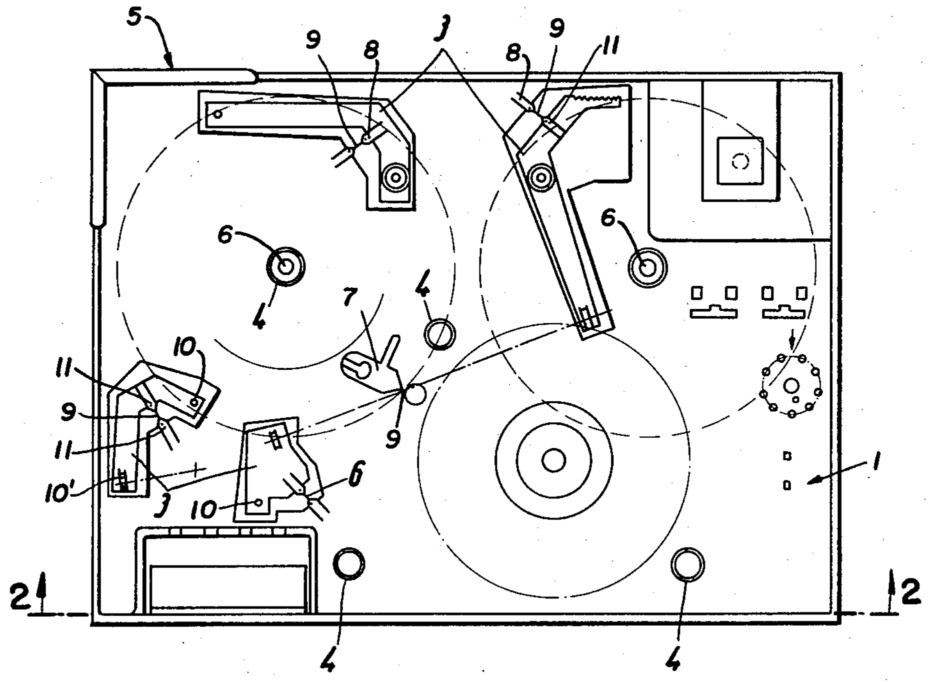
FIG. 1 is a plan view of the invention as assembled in a recording and/or reproducing instrument.

Referring to FIGS. 1 and 2, the base plate 1 consists of a single piece of thermoplastic synthetic material which was injection-molded to include a chassis portion 2, the lever portions 3 and bearings 4 required for the operating functions. For enhancing its stability, the chassis 2 has been inserted into a frame 5 which preferably simultaneously forms the instrument housing. The levers 3 may be either control levers or forward and reverse levers. Some of the bearing blocks 4 include cylindrical bores 6 for the insertion of connecting bolts or spindles (not shown) for rotatably mounted components. The brakes 7 are connected to the chassis in the same manner as the levers 3.

Figure 3:
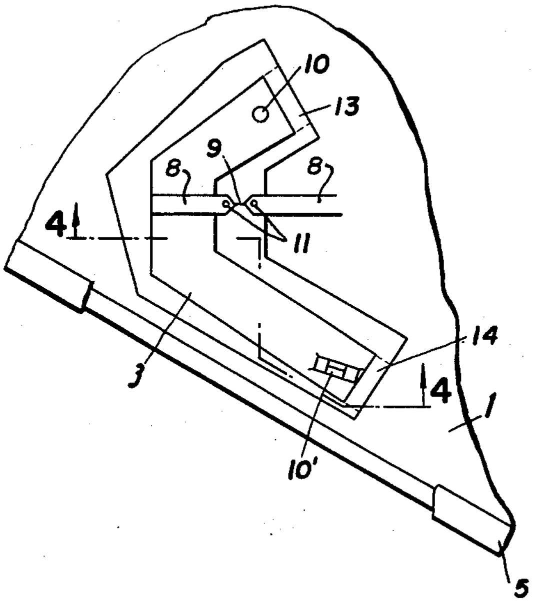
FIG. 3 is an enlarged view of a portion of FIG. 1.

Referring now to FIG. 3, the same shows an enlarged portion of FIG. 1. In particular, an enlarged view of a lever 3 is depicted and is shown to be directly connected to the chassis 2 via a connecting portion 8 which serves as a fulcrum and includes a pivot axis in a region 9 of reduced cross section. Openings 10 and 10', for the insertion of push or pull rods (not shown), which would be connected to, for example, an advance lever 3, are simultaneously formed in the same injection-molding process which produces the article 1 together with its various portions. Extending through the fulcrum or connecting portion 8 are holes 11, in parallel relationship to each other and to pivot axis in the connecting portion 8. One hole 11 is located on the lever 3 side of reduced cross section region 9 and the other hole 11 is located on the chassis 2 side of region 9.

Figure 4:
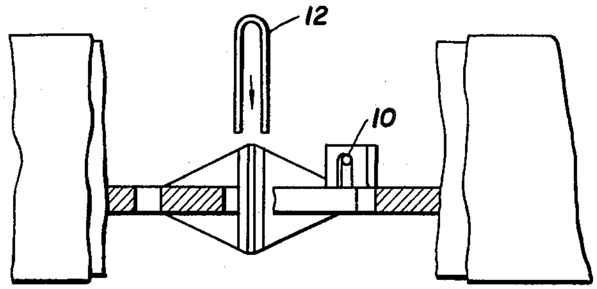
FIG. 4 is a section of FIG. 3 viewed along line 4—4.

As best seen in FIG. 4, a U-shaped element 12 is insertable, one leg in each of said holes 11, thereby to reinforce the pivot axis of the region 9 by relieving stresses resulting under heavy load conditions. Referring again to FIG. 3, when the article 1 is produced, the lever 3 is initially connected to the chassis at three places 8, 13 and 14 in order to guarantee a better molding of the individual parts. One of these connecting places 8 has a cross section which is reduced in such a manner that it serves as the fulcrum for the lever 3 after the other contact points 13 and 14 have been severed in any well known manner, for example, by stamping.

Figure 6:
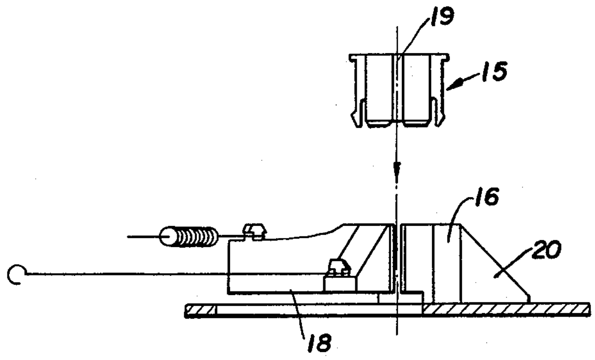
FIG. 6 is an enlarged view of FIG. 5 viewed along line 6—6 just prior to insertion of a connecting means.
Figure 5:
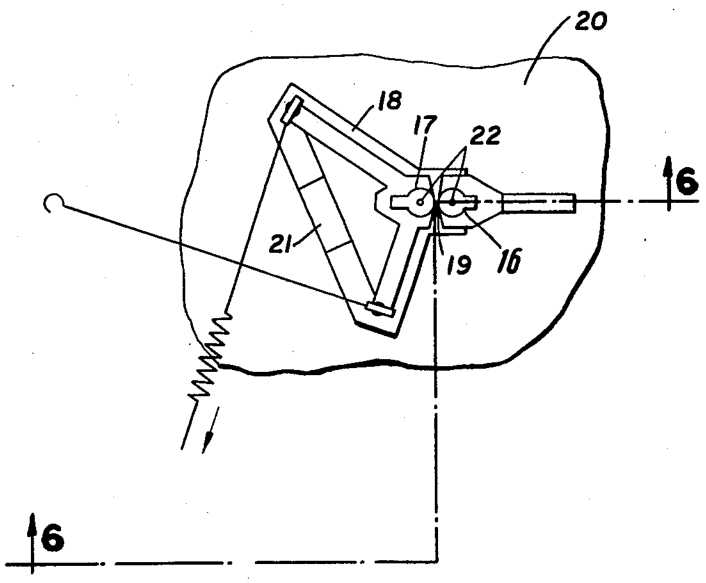
FIG. 5 shows another embodiment according to the invention.

In the embodiment according to FIGS. 5 and 6, a separately produced connecting member 15 is being used which consists of a thermoplastic synthetic material and which has a reduced cross section 19 in its center region. This connecting member 15 fits exactly into the recesses 16 and 17, respectively, provided therefor in the chassis portion 20, on one hand, and in the lever portion 18, on the other hand. After insertion of the connecting member 15, the connecting portion at 21 which connects the lever 18 with the chassis 20 during the injection-molding process is severed in any well known manner. The connecting member 15 now serves as the fulcrum for the lever 18 in exactly the same manner as the connecting portion 8 of FIGS. 1–4. Here, as in the previously discussed embodiment, two holes 22 extend through the connecting member 15, one on each side of the pivot axis provided by cross section 19. The holes 22 extend in parallel relationship both with respect to each other and to the pivot axis. A U-shaped element can be inserted into holes 22 thereby to relieve the fulcrum or connecting member 15, particularly when heavy loads are met.

The embodiment of the invention shown in FIGS. 5 and 6 has the advantage that all except the separate connecting member 15 may be manufactured from a considerably less expensive synthetic material and that the connecting member 15 may be manufactured from a more durable, and therefore better, material. The connecting member 15, thus manufactured from a material of better quality, will be substantially unbreakable and the recording and/or reproducing instrument will be substantially fault-free.

It will be understood that the above description of the present invention is susceptible to various modifications, changes and adaptations, and the same are intended to be comprehended within the meaning and range of equivalents of the appended claims.

I claim:

1. An article of manufacture, comprising, in combination:

a. a chassis constructed in a mold from a synthetic material, and a movable lever having a plane of movement and constructed in its plane of movement from a synthetic material in the same mold as said chassis at the same time as said chassis and joined to said chassis by a plurality of connecting members, all but one of said connecting members being severed;

b. connection means constructed separately from said chassis and said lever and connected between said chassis and said lever and arranged to permit pivotal movement between said chassis and said lever; and c. the remaining connecting member being integrally connected between said chassis and said lever so that said chassis, said lever and said integral member define a unitary structure; said integral member and said connection means being the only connecting members between said chassis and said lever, said integral member being arranged adjacent said connection means and provided with a region of reduced cross section to define a pivot axis between said chassis and said lever.

2. An article of manufacture as defined in claim 1, wherein said connection means is a U-shaped member which reinforces said integral member.

3. An article of manufacture, comprising, in combination:

a. a chassis constructed in a mold from a synthetic material, and a movable lever having a plane of movement and constructed in its plane of movement from a synthetic material in the same mold as said chassis at the same time as said chassis and joined to said chassis by a connecting member, said member being severed; and b. connection means constructed separately from said chassis and said lever and connected between said chassis and said lever and arranged to permit pivotal movement between said chassis and said lever, and wherein said connection means is constructed from a thermoplastic synthetic material and has a region of reduced cross section near its center, which section defines a pivot axis and is arranged between said chassis and said lever, and wherein said chassis and said lever each define a respective recess which is dimensioned to receive a respective portion of said connection means so that said connection means pivotally connects said lever means and said chassis to another, the connecting member being severed.

4. An article of manufacture as defined in claim 3 wherein said recesses are constituted by holes, said holes being parallel to each other as well as to said axis about which said pivotal movement between said chassis and said lever is permitted to take place.

* * * * *